July 23, 1968  J. M. DHOSI  3,393,556
HIGH SPEED DEFLECTOMETER

Filed Aug. 6, 1965  3 Sheets-Sheet 1

INVENTOR.
JOSEPH M. DHOSI
BY
ATTORNEY.

July 23, 1968

J. M. DHOSI 3,393,556

HIGH SPEED DEFLECTOMETER

Filed Aug. 6, 1965

INVENTOR.
JOSEPH M. DHOSI

BY *E. J. Kalil*

ATTORNEY.

July 23, 1968　　　　　J. M. DHOSI　　　　　3,393,556
HIGH SPEED DEFLECTOMETER

Filed Aug. 6, 1965　　　　　　　　　　　　　　　3 Sheets-Sheet 3

INVENTOR.
JOSEPH M. DHOSI
BY
E. J. Kalil
ATTORNEY.

United States Patent Office 3,393,556
Patented July 23, 1968

3,393,556
HIGH SPEED DEFLECTOMETER
Joseph M. Dhosi, Jamaica Plain, Mass., assignor to Transarc, Incorporated, Charlestown, Mass., a corporation of Massachusetts
Filed Aug. 6, 1965, Ser. No. 477,859
9 Claims. (Cl. 73—88.5)

ABSTRACT OF THE DISCLOSURE

A strain gauge measuring device comprising an element having a curved surface for receiving a flexible tape in riding engagement therewith. The tape associated with the device rides longitudinally along the curved surface and has at least one electrically sensitive strain gauge integrally disposed along a portion of the tape so as to ride on and off the curved surface during relative movement between the tape and the curved surface. The strain gauge has leads for connection to an indicating circuit.

This invention relates to a displacement measuring device and, in particular, to a deflectometer for use, for example, in measuring deflection during the physical testing of materials, such as a tensile type test conducted with either a low or high strain rate testing machine. The deflectometer is advantageously useful for determining high strain rate occurring over time durations of up to 0.1 second or higher.

Several techniques have been proposed to obtain a record of strain during the progress of a tensile type test occurring over a time duration of less than 0.1 second. One method has been to use a magnetic tape containing signals of known frequency. The tape is pulled through a tape head by the motion of the testing crosshead or piston and a record of deflection versus time then obtained. A major drawback of this system is the high cost of combining the recording with a trace of the stress to give a single curve.

The use of the conventional extensometer involving the linear variable differential transformer (LVDT) likewise had its drawbacks. The employment of a small deflection transformer in the range of 0.25 inch with, for example, a leverage of 10 to 1 was found to suffer from serious inaccuracies due to the magnification of errors induced by mechanical linkages. Likewise, the use of the more recent D.C. type of the linear variable differential transformer with a throw of, for example, over 3 inches was found to have poor resolution as well as the additional problem associated with the filtering of an oscillator signal of 50 kc. or other frequency, which at the higher oscilloscope magnifications was stronger than the test signal and this interfered with the required resolution.

The use of conventional strain sensing gauges of the electric resistance wire or foil types appeared to be desirable because of their inherently high sensitivity and cleanliness of signal, and their relatively low cost. While the use of such gauges on various types of deflection beams enabled satisfactory recording at low deformation rates, unsatisfactory results are usually obtained at extremely high deformation rates due to the problem of inertia presented by even the lightest beams.

I now provide a sensing device or assembly that overcomes the foregoing problems and which is capable of measuring accurately the strain of a test piece undergoing test in either a low or high strain rate testing machine. The novel strain rate sensing device is particularly useful in determining high strain rate over a time duration of less than 0.1 second.

It is thus the object of the invention to provide a sensitive strain measuring device having a long throw (or total strain capacity) and capable of being used over a wide range of strain rates ranging from low deformation to extremely high deformation rates.

Another object is to provide a high speed deflectometer.

A still further object is to provide a sensitive sensing means for measuring displacement as it occurs.

These and other objects will more clearly appear when taken in conjunction with the following disclosure and the accompanying drawing, wherein.

Stating it broadly, my invention is a strain gauge displacement measuring device comprising a tape-supporting element having a curved surface for receiving a flexible tape in riding engagement therewith. The tape rides along or is supported by at least a portion of the curved surface and is held taut during its contact with the curved surface. At least one strain gauge element comprising material electrically sensitive to strain, such as a flat wire grid or foil of electrical resistance metal, is integrally disposed along a portion of the tape, for example, affixed by bonding, cementing or other means, so as to ride on and off the curved surface when the tape is subjected to movement along the curved surface. The strain gauge may be integral with the tape by being a part of the tape itself. Thus, as the tape moves over the curved surface, the outer fibers of the tape are subjected to strain which changes the electrical characteristics of the strain gauge cemented thereto. Conversely, as the strain gauge leaves the curved surface, a change in electrical characteristics also occurs. The strain gauge has leads which are connectible to an electrical indicating circuit, such as a Wheatstone bridge. Thus, any displacement to which the tape is subjected wherein the strain gauge moves onto or off the curved surface results in a change of electrical characteristics which is related to the linear displacement of the tape as it moves longitudinally along the curved surface.

As will be appreciated, the movement of the tape may be relative to that of a curved surface. That is to say the tape can either move onto a curved surface or a curved surface can be brought into contact with the tape and cause the tape to conform to at least a portion of the curved surface.

A material having piezo electric properties may likewise be used as a strain sensitive material. The expression "strain gauge element" is meant to include the use of such material and any other material which is electrically sensitive to strain.

Figure 1:
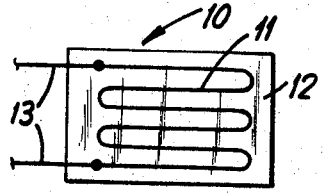
FIG. 1 is illustrative of one of several kinds of conventional strain gauge elements comprising, by way of example, an electric resistance wire in the form of a flat grid.

Referring to FIG. 1, a conventional strain gauge 10 is shown in the form of a flat wire grid 11 bonded to a carrier sheet 12 of paper or paper impregnated with plastic or the like. Leads 13 are provided extending from the grid for connection to an indicating circuit. To obtain maximum performance, the active element of resistance wire should be as near as possible to the strain-producing surface as it is drawn over it. The wire size is generally about 0.001 to 0.0015 in size. As will be appreciated, a variety of metals may be employed as the strain sensitive material. For example, wire having a normal composition of 45% Ni, 55% Cu; or 52% Fe, 36% Ni, 8.0% Cu and the balance Mn, Mg, Si, C and a trace of V (isoelastic wire) may be used. A copper-nickel alloy designated in the trade as Constantan may be employed, as well as Nichrome V, a nickel-chromium alloy.

Figure 2:
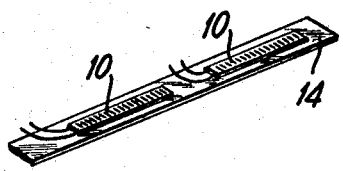
FIG. 2 shows the arrangement of two such strain gauge elements cemented or bonded to and along a flexible tape or belt of thin material, such as a thin steel strip.

The strain gauge of the aforementioned type 10 is bonded or cemented on the surface of a thin tape 14 as shown in FIG. 2. The cement used in bonding the gauge to the tape may be a phenolic resin or other suitable adhesive. A tape found suitable for the purpose is a thin strip of steel of negligible mass of about 0.004 inch thick and one-half inch wide. The strain gauges mounted to the steel tape may be any desirable size, for example, about 2½ inches long.

Figure 3:
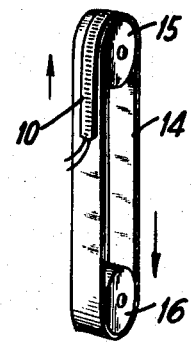
FIGS. 3 and 3A depict several embodiments for utilizing the inventive concept.

In the embodiment shown in FIG. 3, the steel strip 14 is fashioned as a belt tautly about rotatably mounted wheels 15, 16. Thus, as the belt is caused to move about the wheels, strain gauge 10 is subjected to strain as it moves about the wheel due to the radius of curvature imposed upon the steel belt which strains the outer fibers.

Figure 3A:
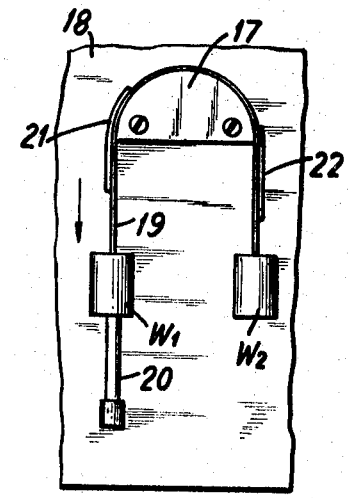

The combination of the low mass of the thin steel strip and the wheels mounted on ball bearings maintains inertia to a minimum. The movement of the steel belt or tape in a flat plane results in no significant deformation of the tape; however, when the tape conforms to the curved surface, there is sufficient fiber elastic strain in the steel tape to be detected by the strain gauge. As shown in FIG. 3A, the curved surface need not be rotatable. There a curved element is shown mounted onto a backing member 18 with a steel tape 19 hanging tautly from the curved surface by virtue of counterweights $W_1$ and $W_2$, the weight of $W_1$, plus coupling element 20 being equal to the weight of $W_2$ so as to provide a balanced system. The curved surface is highly polished and lubricated so as to provide an anti-friction surface. Attached to the tape are two strain gauge elements 21 and 22. The coupling member 30 is for attachment to, for example, a crosshead of a testing machine.

Figure 12:
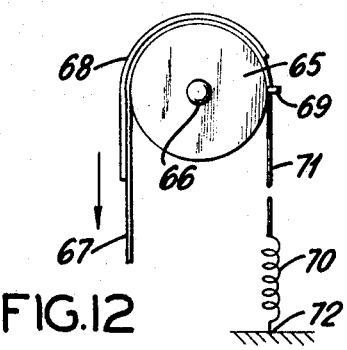

Another embodiment is that shown in FIG. 12 which shows a rotatable wheel 65 axially mounted at 66 and having a tape 67 to which is bonded a strain sensitive gauge 68, one end of the tape being anchored to the wheel by fastening means 69. The rotation of the wheel is biased in a home position by means of biasing spring 70 via wheel connecting means 71, the spring being anchored at 72. The free end of belt 67 may be connected to displacing means, such as the crosshead of a testing machine. As displacement occurs, the tape leaves the wheel against the biasing action of the spring, during which some strain is being relaxed in gauge 68. Upon completion of the displacement, the wheel rotates back to home position via the action of biasing spring 70 as it contracts.

Figure 14:
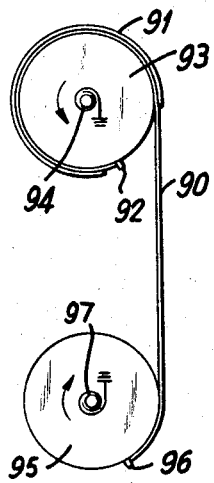
FIG. 14 is representative of still another embodiment of the invention.

As an alternative embodiment to FIG. 12, I may employ a rotatable wheel having coaxially associated with it a biasing spring like that employed for a retractable window shade. Referring to FIG. 14, I show tape 90 and its integrally associated electrically sensitive gauge element 91, the tape being anchored to the wheel 93 at 92 and then partially or fully wound around the periphery of the wheel against the biasing action of spring 94 or other means. Similarly, the tape is anchored to wheel 95 at point 96 and is adapted to wind around the wheel against the biasing action of spring 97 or other means. This embodiment enables long throw or range of displacement by employing a length of tape that may be wound two, three, four or more times about the wheel. In converting the readings, it will be appreciated that allowance must be made for the gradual increase in diameter of the taped wheel where more than one layer of tape is involved. Another embodiment is to use a rotatable mandrel or wheel around which tape may be wound several times as a helix to provide a larger range of displacement.

The extent of strain $\epsilon$, in units of length per unit of length, to which the flexible steel is subjected can be easily determined either theoretically or empirically. This strain $\epsilon$ would be largely determined by the degree of curvature and by the thickness of the steel tape. In the case of a circular curvature every portion of the part of the tape which conforms to the periphery of the curved surface, e.g., the periphery of the wheel, is subjected along its conformed length to the same outer fiber strain. Thus, the total elongation of a given strain gauge is proportional to the length of that part of the gauge which is riding on the periphery of the wheel, or:

(1) $$E = L\epsilon$$

where $L$ = the original length of that portion of the gauge undergoing curvature.

In turn, the increase in the original resistance, R of the gauge (unstrained) is proportional to the elongation or increase in total length caused by curvature or (2) $$R_c = EK$$

where:
$R_c$ = the increase in R caused by elongation due to curvature, and
$K$ = the gauge factor or change in resistance per change in length or $$\frac{dR}{R} \div dE$$

By combining Equations 1 and 2, the following equation is obtained:

(3) $$R_c = L\epsilon K$$

Figure 4:
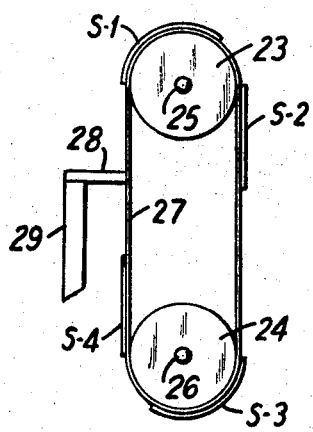
FIGS. 4 and 5 illustrate one method by which the embodiment of FIG. 3 may be used as a deflectometer.

If the entire gauge element is on the wheel and therefore subject to curvature, as is gauge element S-1 in FIG. 4:

$$R_c = L_1 \epsilon K = R_{c1}$$

where $L_1$ = the original (unstrained) length of the entire gauge element.

Figure 5:
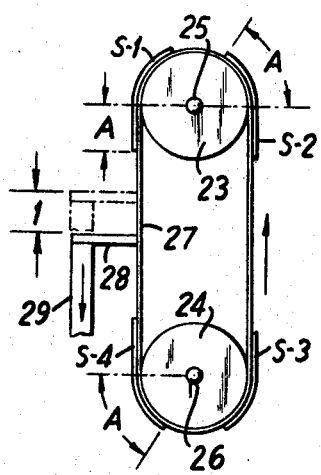

Referring to the embodiment shown in FIGS. 4 and 5, the rotatable wheels 23 and 24 are shown in fixed rotatable positions relative to each other, with the center 25 of wheel 23 vertically disposed relative to the center 26 of wheel 24. Mounted transversely of the steel tape or belt 27 is a connecting element 28 which is in turn coupled to a piston rod 29 or member of a crosshead of a testing machine. Referring to FIGURE 5, a movement of the belt 27 of a distance "A" results in that portion of the steel tape and with its gauge S-1 being elastically relieved of its strain or deformation.

That portion of the gauge still subjected to strain is $L_1 - A$ and:

$$R_c = (L_1 - A)\epsilon K = R_{c2}$$

Then the difference in resistance increase caused by curvature or $$\Delta R_c = R_{c1} - R_{c2} = A\epsilon K$$

Since $\epsilon$ and K are constants, it will be noted that the net change (decrease) $\Delta R_c$ is directly proportional to "A," the distance which the tape moved.

Correspondingly, gauge S-2 which was off the wheel in FIG. 4 had an effective L value of zero. Therefore:

$$R_E = L\epsilon K = 0$$

However, in FIG. 5, $R_E = (L + \text{``}A\text{''})\epsilon K$ or gauge S–2 has a net increase in resistance of $R_E$ which is directly proportional to "A," the distance the tape has moved. As will be noted, the effect of gauge S–3 is the same as S–1 and the effect of S–4 is the same as S–2.

Figure 6:
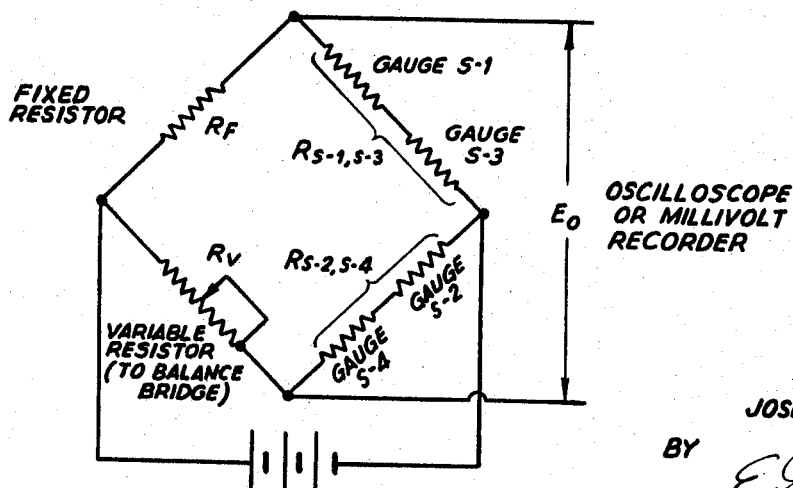
FIG. 6 shows a Wheatstone bridge which may be employed in measuring the changes in condition of the strain gauges undergoing increases and/or decreases in strain.

By incorporating the gauges S–1, S–2, S–3 and S–4 into a Wheatstone bridge, or a potentiometer circuit, or similar balancing or indicating circuit as shown in FIG. 6, the deflection can be measured directly in its units, once the conversion has been set up. By connecting the one or more strain gauges to the bridge as shown in FIG. 6, the only source of unbalance is the change of resistance in the gauges resulting from the application of strain thereto. The difference in potential across the output terminals becomes a measure of that strain which in turn can be related to the amount of displacement be it linear or angular $\alpha$, in the case of metal testing, to the strain of the test piece being tested.

Thus, referring again to FIG. 6, the relationship is determined by the equation:

$$dV_o = \left( \frac{Rs-1, s-3° RF}{Rs-1, s-3+RF} + \frac{Rs-2, s-4° Rv}{Rs-2, s-4+Rv} \right) IKdE$$

where:
$V_o$ = bridge output in volts
$R$ = resistance in ohms
$I$ = current in amperes
$K$ = gauge factor $$\left( \frac{dR}{R} \div dE \right)$$

$E$ = elongation

Figure 8:
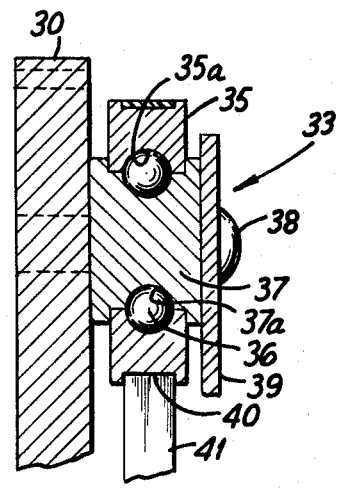
FIG. 8 is a cross-section of a portion of the device of FIG. 7 as viewed in the direction of the arrows.
Figure 7:
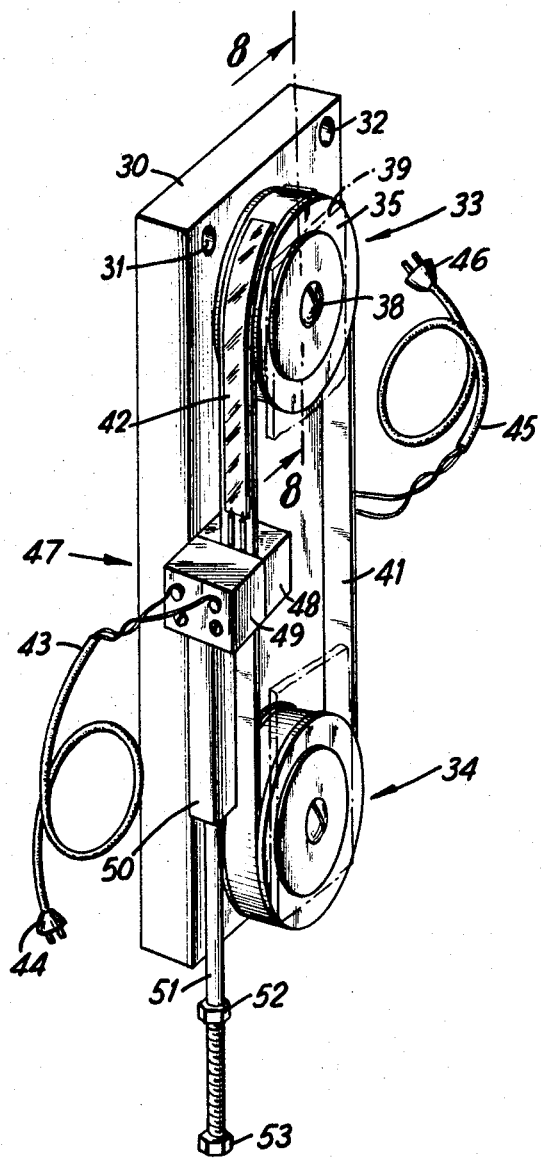
FIG. 7 illustrates in detail the elements making up the device illustrated in FIGS. 4 and 5.

In FIG. 7, a representation of an actual strain gauge device is shown comprising a steel backing plate 30 for mounting onto a test machine via bolt-receiving holes 31, 32. Rotatably mounted on the backing plate are a pair of pulleys 33, 34, the construction of which is shown in more detail in FIG. 8. The pulleys in effect are anti-friction bearings comprising an outer ring 35 having an internal annular groove 35a and an inner ring 37 having an annular groove 37a, the two grooves accommodating ball bearings 36. The inner ring is fixed against backing plate 30 via a bolt 38 and a washer 39. By utilizing a ball bearing construction for the wheels or pulleys, inertia of the system is greatly minimized. The periphery of the outer ring has a flat groove 40 in which steel tape 41 is retained as it negotiates the curved surface of the pulley.

For illustrative purposes, the strain gauge assembly of FIG. 7 is shown with a pair of strain gauges, with one 42 mounted on one side of the steel belt, with a pair of insulated leads 43 and plug 44 associated therewith and another on the opposite side of the steel belt hidden from view with a pair of insulated leads 45 and plug 46, the plugs in each instance being provided for connection to an indicating instrument, such as a Wheatstone bridge.

At the flat portion of the tape or belt, a fixture 47 is attached comprising blocks 48 and 49 secured on each side of the belt in substantially abutting relationship with an arm 50 extending downwardly therefrom with a fastening member 51 attached thereto, the end of the fastening member being threaded and having a stop 52 and a securing nut 53 for securing the arm to, for example, a crosshead of a testing machine or a piston rod. Member 51 passes through a stationary guiding element (not shown), e.g., a journal, to avoid wobbling and reduce vibration.

As stated hereinbefore, a steel strip of about 0.004 inch thick and one-half inch wide has been found satisfactory for the purpose, although the thickness may range from 0.001 inch to 0.009 inch and have any desirable width. The wheels or pulleys may have any desirable outside diameter, for example, 2 inches, the flat peripheral groove for receiving the steel belt or tape being about 0.032 inch deep or other suitable depth. As member 51 is pulled downward by the moving crosshead of the testing machine, strain gauge element 42 leaves wheel 33 and is relaxed, thereby yielding a linear relationship between motion and EMF of the bridge circuit to which the gauge is electrically coupled.

Figure 13:
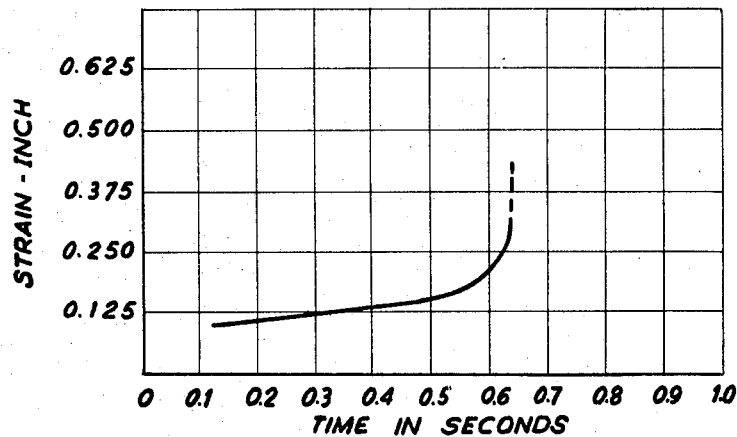
FIG. 13 is a graphical representation of an elongation-time or creep curve.

As shown in FIG. 6, the bridge may be coupled to a millivolt recorder or to a cathode-ray oscilloscope or an oscillographic recorder. The latter is particularly advantageous for high speed work as it enables the instantaneous recording of a creep curve. It may be required to employ an amplifying system to amplify weak but accurate signals produced by the imbalance of the strain gauge bridge. The advantage of using a cathode-ray oscilloscope in dynamic testing is that the tracing produced by the light spot on the screen when the bridge is unbalanced is free from inertia. By employing a camera focused onto the screen, a short-time creep or tensile curve can be obtained instantaneously over a relatively short time period. An example of such a tracing taken from a photographic print utilizing the novel strain gauge device as shown in FIG. 13. The ordinate which represents elongation is marked in elongation intervals of 0.125", while the abscissa is marked in time intervals of 0.1 sec.

The foregoing oscilloscope tracing, which is a short time creep test, was obtained from an actual test of an alloy comprising about 1.41% Ti, about 0.37% Zr, about 0.2% C. and the balance substantially molybdenum. The alloy tested had a gauge length of 1 inch and a gauge diameter of 0.225 inch. A stress of about 15,000 p.s.i. was applied over a time period of about 0.6 second while the specimen was at a temperature of 3800° F. (about 2095° C.).

Figure 9:
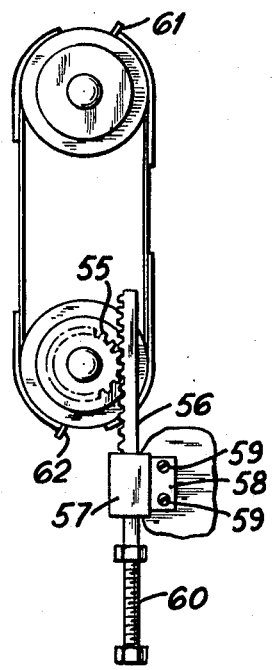
FIG. 9 shows another embodiment of the strain gauge device utilizing a different means of displacing the tape or belt.

As will be appreciated, other means may be employed for linearly displacing the steel tape. For example, a rack and pinion may be employed, as shown in FIG. 9. A pinion 55 is shown coaxially fixed to the shaft supporting one of the wheels with a toothed rack 56 in meshing engagement with the pinion. The rack is supported in a guide 57 which is fixed via a flange 58 to a backing member via fasteners 59. The end of the rack terminates into a threaded arm 60 which may be connected to a crosshead or a piston rod. Since the wheel is driven via a pinion, belt slippage must be avoided. This is achieved by anchoring the belt on each of the wheels via anchoring means 61 and 62.

While the foregoing strain gauge assembly has been described as being advantageously useful with low or high strain rate testing machines, it will be appreciated that it may have other uses not involving such testing machines. For example, the device might be employed as a means for simply measuring angular displacement, the amount of angular displacement being proportional to the strain imparted to or relaxed from a strain gauge. Thus, the device could have application in a vernier dial system where a light tracing of angular displacement might be desirable for read-off; or the angular displacement might be related to a tuning dial or to a variable frequency measuring device.

As will be appreciated, the device of the invention can be used in a variety of ways in the physical testing of materials. For example, in addition to tensile tests or tensile creep measurements, the device may be used in determining the compression characteristics of materials during yield and even torsional characteristics.

Figure 10:
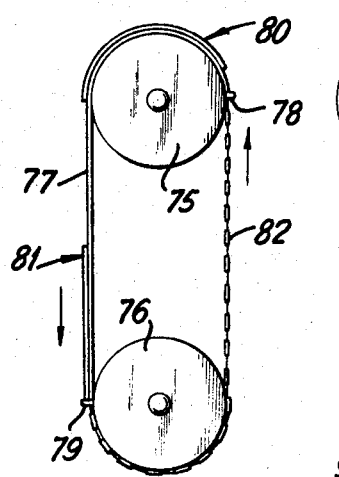
FIGS. 10, 11 and 12 are illustrative of additional embodiments of the invention.
Figure 11:
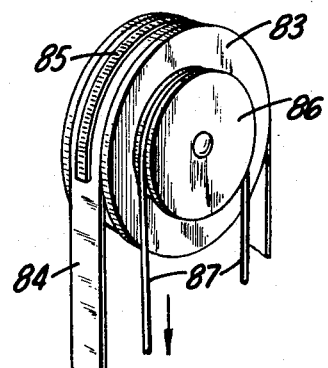

Examples of other embodiments of the invention are shown in FIGS. 10 and 11. The embodiment of FIG. 10 is illustrative of the situation where movement of the belt or tape is effected through the movement of the wheel. Only a portion of tape 77 is shown attached to wheels 75, 76 by fastening means 78 and 79 to avoid slippage. Strain gauges 80 and 81 are shown bonded or cemented to the tape. The remainder of the belt 82 may be constructed of a wire, or cable or similar means.

FIG. 11 shows partially a system comprising a wheel 83 with tape or belt 84 in riding engagement therewith having at least one strain gauge 85 bonded to it. The wheel has coaxially mounted with it a pulley 86 driven by belt or chain means shown diagrammatically by numeral 87. By incorporating suitable drive pulley ratios, gear ratios, and the like, the motion may be multiplied or reduced as desired.

In stating that the belt or tape should be held tautly about the curved surface supporting the belt, what is meant is that it should not be so slack as to cause crimping of the strain gauge element. It will be appreciated that when a steel belt is held taut, it may be subjected to slight elastic strain. However, when the device is set up, any slight strain in the system is balanced to a zero reading on the Wheatstone bridge and in effect compensated for. While steel or other metals are desirable as strip material, any tape material may be employed which deforms elastically under stress and recovers when the stress is relieved and to which a strain gauge can be affixed.

As will be appreciated by those skilled in the art, the displacement measuring device contemplated by the invention may also be employed in the same manner as a conventional extensometer. For example, the device may be mounted across a gauge length of the specimen similarly to the conventional extensometer devices which generally employ an LVDT (linear variable differential transformer) type of element.

While the device of the invention has been described wherein the electrically sensitive strain gauge element is integrally disposed on the outside surface of the tape, it will be appreciated that the gauge element may be a part of the tape or even be disposed on the undersurface of the tape whereby the compressive strain of the tape is utilized in detecting displacement.

The term "deflectometer" employed herein is meant to cover displacement measuring devices in general, for example including extensometers and similar devices.

The term "displacement measuring device" is understood to cover a device by means of which displacement is determined, although in effect the device is a sensing means, whose function is similar to the function of an LVDT.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A strain gauge measuring device comprising an element having a curved surface for receiving a flexible tape in riding engagement therewith, a tape associated with said device for riding longitudinally along said curved surface, and at least one electrically sensitive strain gauge integrally disposed along a portion of said tape so as to ride on and off the curved surface during relative movement between the tape and the curved surface, said at least one strain gauge having leads for connection to an indicating circuit.

2. A strain gauge measuring device comprising an element having a curved surface for receiving a flexible tape in riding engagement therewith, a tape associated with said device for riding longitudinally along said curved surface, at least one electrically sensitive strain gauge integrally disposed along a portion of said tape so as to ride on and off the curved surface during relative movement between the tape and the curved surface, said at least one strain gauge having leads for connection to an indicating circuit, and displacement means associated with said device for causing relative movement between said tape and said curved surface when a force is applied to said displacement means.

3. A strain gauge measuring device comprising a mounted rotatable wheel whose periphery is adapted for receiving a flexible tape in riding engagement therewith, a tape riding a portion of said periphery, and at least one electrically sensitive strain gauge integrally disposed along a portion of said tape so as to ride on and off the wheel periphery during longitudinal movement of the tape along said wheel periphery, said at least one strain gauge having leads for connection to an indicating circuit.

4. A strain gauge measuring device comprising a mounted rotatable wheel whose periphery is adapted for receiving a flexible elastically deformable tape in riding engagement therewith, a tape riding a portion of said periphery, means for holding said tape taut, at least one electrically sensitive strain gauge integrally disposed along a portion of said tape so as to ride on and off the wheel periphery when the tape is subjected to longitudinal displacement, said at least one strain gauge having leads for connection to an indicating circuit, and displacement means associated with said device for longitudinally moving said tape along said wheel periphery when a force is applied to said displacement means.

5. A strain gauge measuring device comprising a mounted rotatable wheel whose periphery is adapted for receiving a flexible elastically deformable metal tape in riding engagement therewith, a tape riding a portion of said periphery, and at least one electrically sensitive strain gauge integrally disposed along a portion of said tape so as to ride on and off the wheel periphery when the tape is subjected to longitudinal displacement, said at least one strain gauge having leads for connection to an indicating circuit.

6. A strain gauge measuring device comprising a mounted rotatable wheel whose periphery is adapted for receiving a flexible elastically deformable metal tape in riding engagement therewith, a tape riding a portion of said periphery, means for holding said tape taut, at least one electrically sensitive strain gauge integrally disposed along a portion of said tape so as to ride on and off the wheel periphery when the tape is subjected to longitudinal displacement, said at least one strain gauge having leads for connection to an indicating circuit, and displacement means associated with said device for longitudinally moving said tape along said wheel periphery when a force is applied to said displacement means.

7. A strain gauge displacement measuring device comprising a pair of spaced rotatably mounted wheels, an endless belt of thin elastically deformable metal tape mounted tautly about said wheels, and at least one electrically sensitive strain gauge integrally disposed along a portion of said tape so as to ride on and off at least one of said rotatable wheels when said belt is subjected to movement, said at least one strain gauge having leads for connection to an indicating circuit.

8. A strain gauge displacement measuring device comprising a pair of spaced rotatably mounted wheels, an endless belt of thin elastically deformable metal tape mounted tautly about said wheels, at least one electrically sensitive strain gauge integrally disposed along a portion of said tape so as to ride on and off at least one of said rotatable wheels when said belt is subjected to movement, said at least one strain gauge having leads for connection to an indicating circuit, and displacement means associated with said device for moving said tape when a force is applied to said displacement means.

9. A strain gauge displacement measuring device comprising a pair of spaced rotatably mounted wheels, an endless belt of thin elastically deformable metal tape mounted tautly about and in driving relationship with said wheels, at least one electrically sensitive strain gauge integrally disposed along a portion of said tape so as to ride on and off at least one of said rotatable wheels when said belt is subjected to movement, said at least one strain gauge having leads for connection to an indicating circuit, and means associated with said tape for connecting to a force applying means.

References Cited

UNITED STATES PATENTS

| | | | |
|---|---|---|---|
| 2,546,155 | 3/1951 | Haber et al. | 73—88.5 X |
| 2,880,409 | 3/1959 | Gallentine | 73—88.5 X |
| 3,074,175 | 1/1963 | Ludlam | 73—88.5 X |
| 3,154,067 | 10/1964 | Stenstrom et al. | 73—398 X |

RICHARD C. QUEISSER, *Primary Examiner.*

C. A. RUEHL, *Assistant Examiner.*